(12) United States Patent
Boselli et al.

(10) Patent No.: US 12,194,529 B2
(45) Date of Patent: Jan. 14, 2025

(54) 2XXX ALUMINUM LITHIUM ALLOYS

(71) Applicant: ARCONIC TECHNOLOGIES LLC, Pittsburgh, PA (US)

(72) Inventors: Julien Boselli, Pittsburgh, PA (US); Jen C. Lin, Export, PA (US); Lynette M. Karabin, Ruffs Dale, PA (US); Wei Wen, Allison Park, PA (US)

(73) Assignee: Arconic Technologies LLC, Pittsburgh, PA (US)

(*) Notice: Subject to any disclaimer, the term of this patent is extended or adjusted under 35 U.S.C. 154(b) by 816 days.

(21) Appl. No.: 17/307,453

(22) Filed: May 4, 2021

(65) Prior Publication Data

US 2021/0404038 A1 Dec. 30, 2021

Related U.S. Application Data

(63) Continuation of application No. PCT/US2019/060016, filed on Nov. 6, 2019.
(Continued)

(51) Int. Cl.
*C22C 21/14* (2006.01)
*B22D 21/00* (2006.01)
(Continued)

(52) U.S. Cl.
CPC ............ *B22D 21/007* (2013.01); *C22C 21/14* (2013.01); *C22C 21/16* (2013.01); *C22C 21/18* (2013.01); *B22F 10/28* (2021.01)

(58) Field of Classification Search
None
See application file for complete search history.

(56) References Cited

U.S. PATENT DOCUMENTS 5,462,712 A * 10/1995 Langan ................... C22F 1/057
420/533
5,630,889 A 5/1997 Karabin
(Continued)

FOREIGN PATENT DOCUMENTS

| CN | 101967588 | 8/2012 |
| RU | 2560485 | 8/2015 |

(Continued)

OTHER PUBLICATIONS

Aluminum and Aluminum Alloys—Wrought Products—Temper Designations, International Standard ISO 2107, Third Edition, 2007, pp. 1-9.
(Continued)

*Primary Examiner* — George Wyszomierski
*Assistant Examiner* — Janell C Morillo
(74) *Attorney, Agent, or Firm* — Greenberg Traurig, LLP

(57) ABSTRACT

New 2xxx aluminum alloys having are disclosed. The new 2xxx aluminum alloys generally include 2.5-3.9 wt. % Cu, 0.82-1.20 wt. % Li, 0.5-2.0 wt. % Zn, 0.10-0.60 wt. % Mn, 0.05-0.35 wt. % Mg, from 0.05 to 0.50 wt. % of at least one grain structure control element, wherein the at least one grain structure control element is selected from the group consisting of Zr, Sc, Cr, V, Hf, other rare earth elements, and combinations thereof, up to 0.22 wt. % Ag, up to 0.15 wt. % Fe, up to 0.12 wt. % Si, and up to 0.15 wt. % Ti, the balance being aluminum, incidental elements and impurities. The new 2xxx aluminum alloys may realize an improved combination of two or more of strength, fracture toughness, elongation, and corrosion resistance.

18 Claims, 3 Drawing Sheets

Related U.S. Application Data

(60) Provisional application No. 62/756,963, filed on Nov. 7, 2018.

(51) Int. Cl.
    *C22C 21/16*     (2006.01)
    *C22C 21/18*     (2006.01)
    *B22F 10/28*     (2021.01)

(56) References Cited

U.S. PATENT DOCUMENTS

| | | |
|---|---|---|
| 5,652,063 A | 7/1997 | Karabin |
| 5,665,306 A | 9/1997 | Karabin |
| 5,800,927 A | 9/1998 | Karabin |
| 5,863,359 A | 1/1999 | Karabin et al. |
| 5,865,914 A | 2/1999 | Karabin et al. |
| 5,879,475 A | 3/1999 | Karabin et al. |
| 6,132,531 A | 10/2000 | Fang et al. |
| 6,551,424 B1 | 4/2003 | Haszler et al. |
| 6,773,666 B2 | 8/2004 | Lin et al. |
| 6,783,730 B2 | 8/2004 | Lin et al. |
| 7,087,125 B2 | 8/2006 | Lin et al. |
| 7,449,073 B2 | 11/2008 | Lin et al. |
| 7,625,454 B2 | 12/2009 | Lin et al. |
| 8,157,932 B2 | 4/2012 | Yan et al. |
| 8,287,668 B2 | 10/2012 | Lin et al. |
| 8,349,462 B2 | 1/2013 | Lin et al. |
| 8,840,737 B2 | 9/2014 | Bray et al. |
| 8,845,827 B2 | 9/2014 | Yanar et al. |
| 8,950,465 B2 | 2/2015 | Lin et al. |
| 8,961,715 B2 | 2/2015 | Bray et al. |
| 9,194,028 B2 | 11/2015 | Kamat et al. |
| 9,249,484 B2 | 2/2016 | Kamat et al. |
| 9,249,487 B2 | 2/2016 | Yan et al. |
| 9,315,885 B2 | 4/2016 | Lin |
| 9,359,660 B2 | 6/2016 | Kamat et al. |
| 9,458,528 B2 | 10/2016 | Boselli et al. |
| 9,587,298 B2 | 3/2017 | Lin et al. |
| 9,670,567 B2 | 6/2017 | Jarry |
| 9,890,443 B2 | 2/2018 | Lin et al. |
| 9,926,620 B2 | 3/2018 | Kamat et al. |
| 10,119,183 B2 | 11/2018 | Lin et al. |
| 10,161,021 B2 | 12/2018 | Lin et al. |
| 10,174,409 B2 | 1/2019 | Yan et al. |
| 10,202,673 B2 | 2/2019 | Lin et al. |
| 10,227,679 B2 | 3/2019 | Yan et al. |
| 10,415,129 B2 | 9/2019 | Danielou et al. |
| 10,494,702 B2 | 12/2019 | Kim et al. |
| 10,633,724 B2 | 4/2020 | Unal et al. |
| 11,103,919 B2 | 8/2021 | Yan et al. |
| 2005/0167012 A1 | 8/2005 | Lin et al. |
| 2005/0238528 A1 | 10/2005 | Lin et al. |
| 2006/0289093 A1 | 12/2006 | Yan et al. |
| 2007/0125460 A1 | 6/2007 | Lin et al. |
| 2008/0066833 A1 | 3/2008 | Lin et al. |
| 2010/0047113 A1 | 2/2010 | Lin et al. |
| 2010/0129683 A1 | 5/2010 | Lin et al. |
| 2010/0276108 A1 | 11/2010 | Stol et al. |
| 2012/0055590 A1 | 3/2012 | Kamat et al. |
| 2012/0225271 A1 | 9/2012 | Boselli et al. |
| 2014/0050936 A1 | 2/2014 | Boselli et al. |
| 2014/0366997 A1 | 12/2014 | Kamat et al. |
| 2014/0366998 A1 | 12/2014 | Kamat et al. |
| 2014/0367000 A1 | 12/2014 | Kamat et al. |
| 2015/0020930 A1 | 1/2015 | Kamat et al. |
| 2016/0107265 A1 | 4/2016 | Lin et al. |
| 2016/0138400 A1 | 5/2016 | Karabin et al. |
| 2016/0368588 A1 | 12/2016 | Pignatel et al. |
| 2017/0014937 A1 | 1/2017 | Wilhelmy et al. |
| 2017/0088920 A1 | 3/2017 | Boselli et al. |
| 2017/0120386 A1 | 5/2017 | Lin et al. |
| 2017/0120393 A1 | 5/2017 | Lin et al. |
| 2017/0121795 A1 | 5/2017 | Yan et al. |
| 2017/0175239 A1 | 6/2017 | Ahmed et al. |
| 2017/0175240 A1 | 6/2017 | Wen et al. |
| 2017/0222108 A1 | 8/2017 | Chang et al. |
| 2017/0292174 A1 | 10/2017 | Karabin et al. |
| 2017/0306447 A1 | 10/2017 | Lin et al. |
| 2017/0306448 A1 | 10/2017 | Lin et al. |
| 2017/0306449 A1 | 10/2017 | Lin et al. |
| 2017/0306450 A1 | 10/2017 | Lin et al. |
| 2017/0306457 A1 | 10/2017 | Lin et al. |
| 2017/0306460 A1 | 10/2017 | Lin et al. |
| 2017/0314112 A1 | 11/2017 | Go et al. |
| 2017/0326690 A1 | 11/2017 | Heard et al. |
| 2017/0369978 A1 | 12/2017 | Kang et al. |
| 2018/0171438 A1 | 6/2018 | Yan et al. |
| 2018/0200834 A1 | 7/2018 | Kilmer et al. |
| 2018/0274063 A1 | 9/2018 | Wen et al. |
| 2018/0305795 A1 | 10/2018 | Becker et al. |
| 2018/0363114 A1 | 12/2018 | Whelchel et al. |
| 2019/0010591 A1 | 1/2019 | Das et al. |
| 2019/0024225 A1 | 1/2019 | Tang et al. |
| 2019/0035773 A1 | 1/2019 | Lo et al. |
| 2019/0193158 A1 | 6/2019 | Wilhelmy et al. |
| 2019/0309402 A1 | 10/2019 | Karabin et al. |
| 2019/0357647 A1 | 11/2019 | Kilmer et al. |
| 2019/0360082 A1 | 11/2019 | Ahmed et al. |
| 2019/0376165 A1 | 12/2019 | Wen et al. |
| 2020/0056268 A1 | 2/2020 | Heard et al. |
| 2020/0080182 A1 | 3/2020 | Ahmed et al. |
| 2020/0095664 A1 | 3/2020 | Wen et al. |
| 2020/0115780 A1 | 4/2020 | Boselli et al. |
| 2020/0165707 A1* | 5/2020 | Whelchel ................ C22C 21/16 |
| 2020/0277691 A1 | 9/2020 | Lin et al. |
| 2021/0340656 A1 | 11/2021 | Boselli et al. |

FOREIGN PATENT DOCUMENTS

| | | | |
|---|---|---|---|
| WO | WO2005/075692 | 8/2005 | |
| WO | WO2009/036953 | 3/2009 | |
| WO | WO-2017093680 A1 * | 6/2017 | ............. C22C 21/14 |
| WO | WO2017/137260 | 8/2017 | |
| WO | WO2018/157159 | 8/2018 | |
| WO | WO2019/055623 | 3/2019 | |
| WO | WO2019/055630 | 3/2019 | |
| WO | WO2019/084045 | 5/2019 | |
| WO | WO2019/099719 | 5/2019 | |
| WO | WO2019/161137 | 8/2019 | |
| WO | WO2019/191056 | 10/2019 | |
| WO | WO2019/245720 | 12/2019 | |
| WO | WO2019/245784 | 12/2019 | |
| WO | WO2019/245922 | 12/2019 | |
| WO | WO2020/081150 | 4/2020 | |
| WO | WO2020/081157 | 4/2020 | |
| WO | WO2020/081255 | 4/2020 | |

OTHER PUBLICATIONS

AMS 4328A, "Aluminum Alloy, Plate (2397-T87) 2.8Cu—1.4li—0.30Mn—0.12Zr—0.10Zn Solution Heat Treated, Cold Worked, and Artificially Aged", Jul. 2006, SAE Aerospace, pp. 1-6.

AMS 4413A, "Aluminum Alloy, Plate 3.5Cu—10Li—0.40Mg—0.35Mn—0.45Ag—0.12Zr (2050-T84) Solution Heat Treated, Stress Relieved, and Artificially Aged", Dec. 2012, SAE Aerospace, pp. 1-6.

ANSI-H-35.1(M), American National Standard Alloy and Temper Designation System for Aluminum, 2009, pp. 1-11.

Balmuth, E. S., et al., "Fracture and Fatigue Crack Growth Resistance of Recrystallized Al—Li Alloys," *Materials Science Forum*, 217-222:1365-1370 (1996).

Davis, J.R.—ASM Handbook, Alloy and Temper Designation Systems, 1993, pp. 29-30, ASM International.

Gayle, F. W., et al., "Composition and Anisotropy in Al—Cu—Li—Ag—Mg—Zr Alloys," *Scripta Metallurgica et Materialia*, vol. 30, No. 6, pp. 761-766, 1994.

International Search Report and Written Opinion, dated Apr. 9, 2020, from corresponding International Patent App. No. PCT/US2019/060016.

International Search Report and Written Opinion, dated Jul. 8, 2011, from corresponding International Patent Application No. PCT/US2011/031975.

(56) References Cited

OTHER PUBLICATIONS

Registration Record Series Teal Sheets, "*International Alloy Designations and Chemical Composition Limits for Wrought Aluminum and Wrought Aluminum Alloys*," The Aluminum Association, pp. 1-31 (2015).

Reynolds, A. P., et al., "The Effect of Thermal Exposure on the Fracture Behavior of Aluminum Alloys Intended for Elevated Temperature Service," *Elevated Temperature Effects on Fatigue and Fracture, ASTM STP 1297*, R.S. Piascik et al., Eds., pp. 191-205 (1997).

* cited by examiner

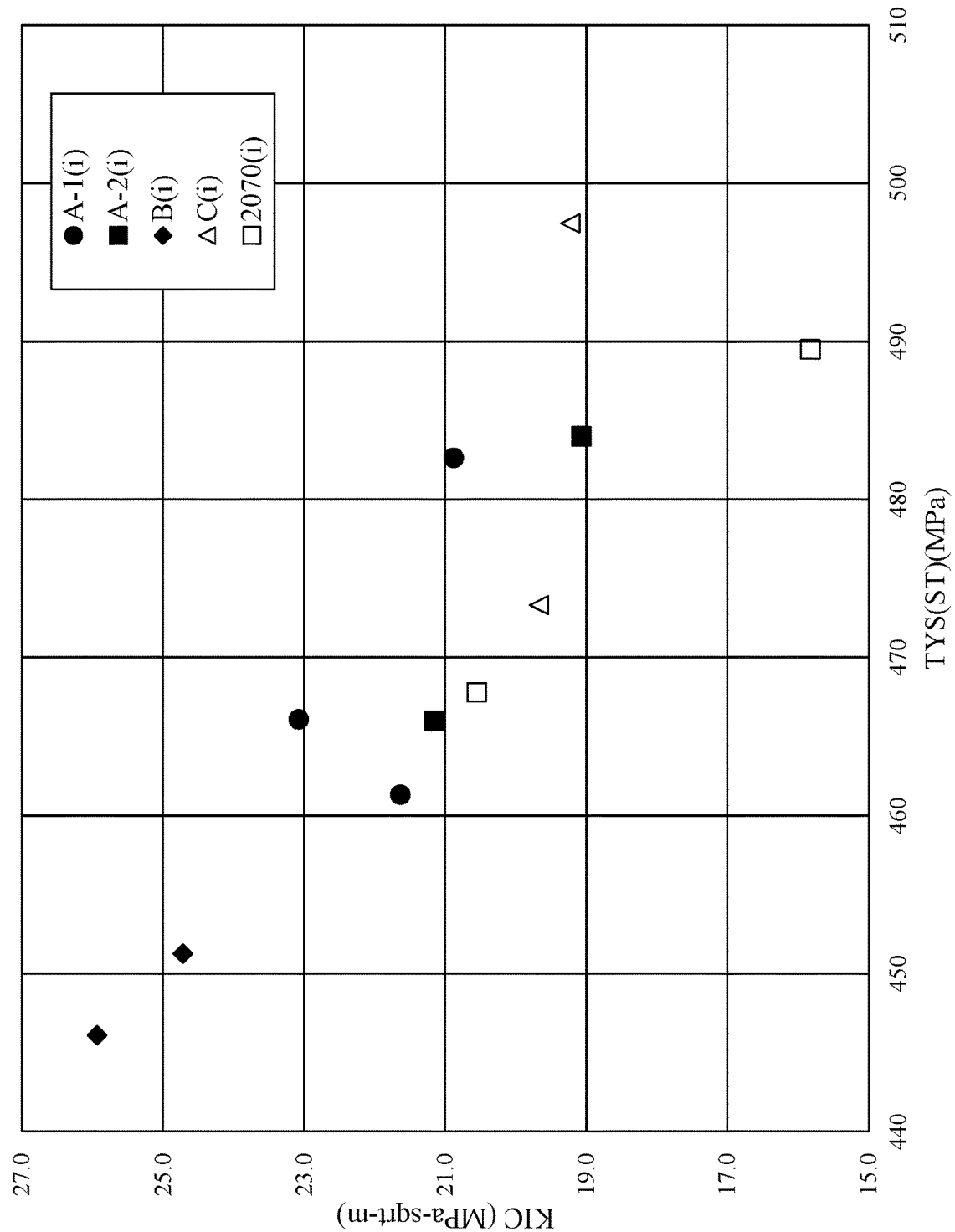

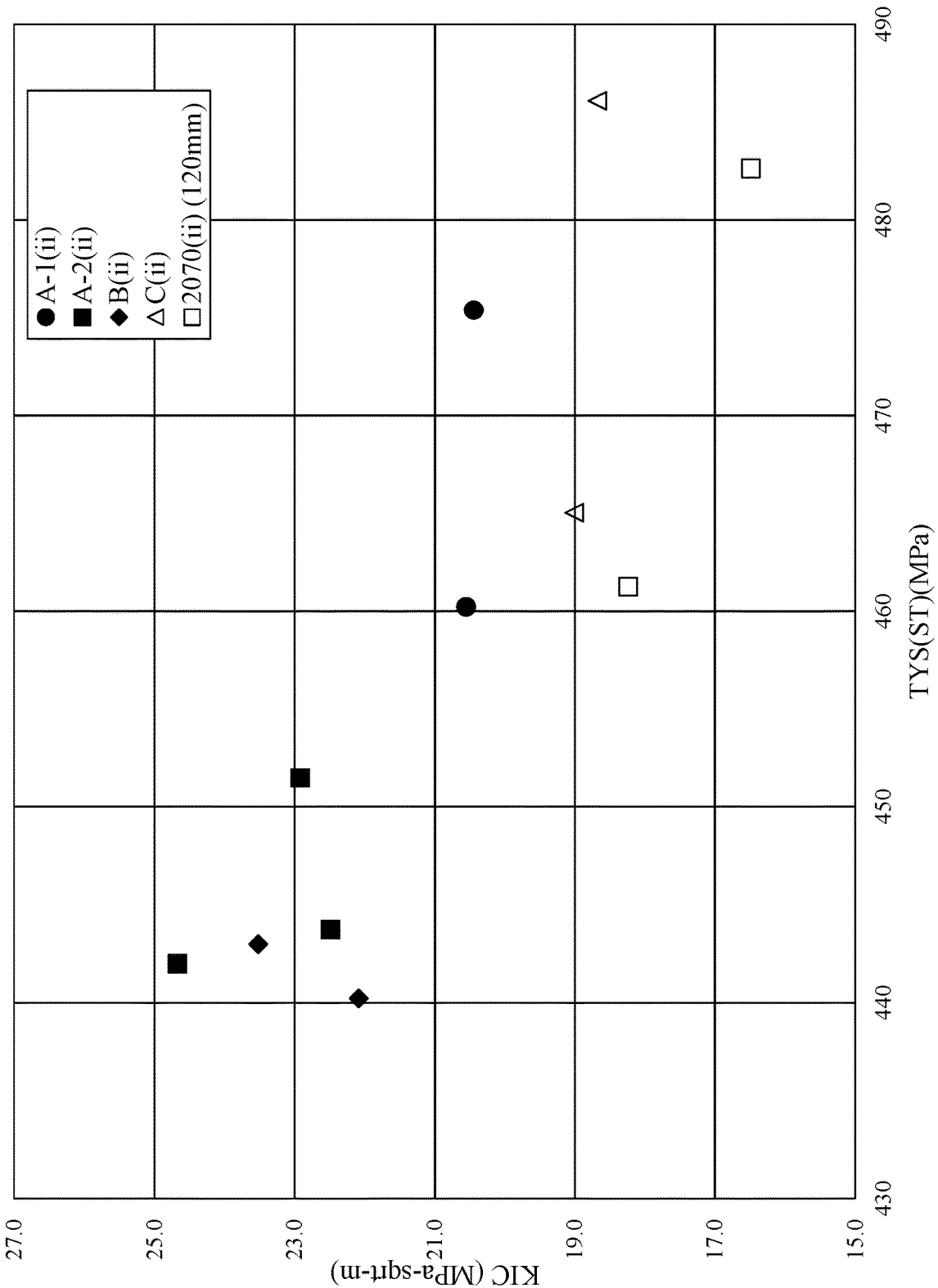

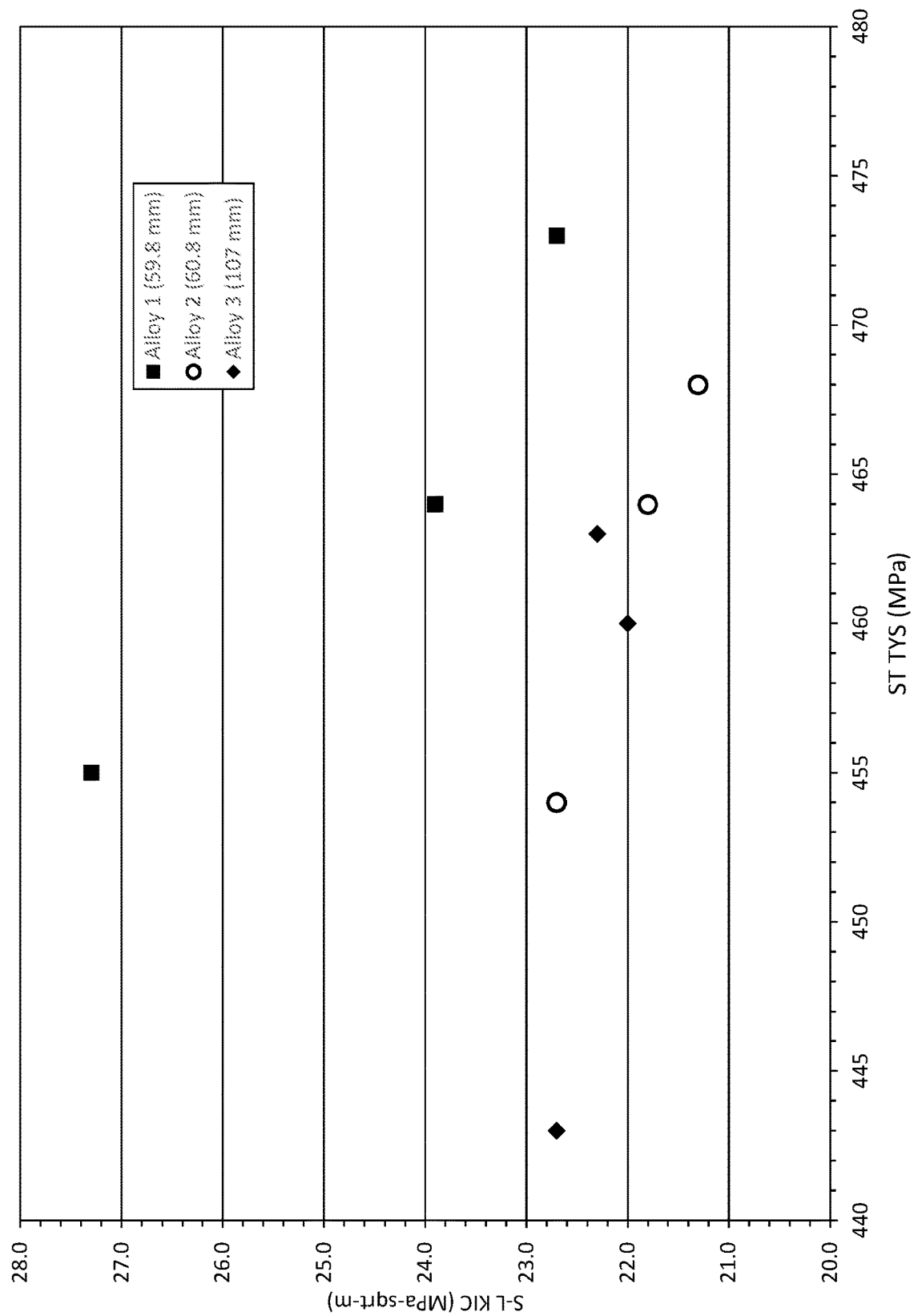
FIG. 3 - ST Properties of Example 2 Alloys

2XXX ALUMINUM LITHIUM ALLOYS

CROSS-REFERENCE TO RELATED APPLICATION

This application is a continuation of International Patent Application No. PCT/US2019/060016, filed Nov. 6, 2019, which claims the benefit of priority to U.S. Patent Application No. 62/756,963, filed Nov. 7, 2018, entitled "2XXX ALUMINUM LITHIUM ALLOYS", each of which is incorporated herein by reference in its entirety.

FIELD OF THE INVENTION

The present disclosure relates to 2xxx aluminum lithium alloys and products made therefrom.

BACKGROUND

Aluminum alloys are useful in a variety of applications. However, improving one property of an aluminum alloy without degrading another property often proves elusive. For example, it is difficult to increase the strength of an alloy without decreasing the toughness of an alloy. Other properties of interest for aluminum alloys include corrosion resistance and fatigue crack growth rate resistance, to name two.

SUMMARY OF THE INVENTION

Broadly, the present patent application relates to new 2xxx aluminum lithium alloys. Generally, the new 2xxx aluminum lithium alloys comprise (and some instances consist essentially of or consist of) from 2.5 to 3.9 wt. % Cu, from 0.82 to 1.20 wt. % Li, from 0.5 to 2.0 wt. % Zn, from 0.10 to 0.60 wt. % Mn, from 0.05 to 0.35 wt. % Mg; from 0.05 to 0.50 wt. % of at least one grain structure control element, wherein the at least one grain structure control element is selected from the group consisting of Zr, Sc, Cr, V, Hf, other rare earth elements, and combinations thereof, up to 0.22 wt. % Ag, up to 0.15 wt. % Fe, up to 0.12 wt. % Si, and up to 0.15 wt. % Ti, the balance being aluminum, incidental elements and impurities. Products incorporating such alloy compositions may achieve an improved combination of, for instance, two or more of strength, elongation, fracture toughness and stress corrosion cracking resistance.

i. Composition

As noted above, copper (Cu) is included in the alloy, and generally in the range of from 2.5 wt. % to 3.9 wt. % Cu. More specific embodiments relating to copper are provided near the end of this section.

As noted above, lithium (Li) is included in the new alloy, and generally in the range of from 0.82 wt. % to 1.20 wt. %. In one embodiment, a new alloy includes at least 0.85 wt. % Li. In another embodiment, a new alloy includes at least 0.875 wt. % Li. In yet another embodiment, a new alloy includes at least 0.90 wt. % Li. In another embodiment, a new alloy includes at least 0.925 wt. % Li. In another embodiment, a new alloy includes at least 0.95 wt. % Li. In one embodiment, a new alloy includes not greater than 1.15 wt. % Li. In another embodiment, a new alloy includes not greater than 1.10 wt. % Li. In yet another embodiment, a new alloy includes not greater than 1.075 wt. % Li. In another embodiment, a new alloy includes not greater than 1.050 wt. % Li. In yet another embodiment, a new alloy includes not greater than 1.025 wt. % Li. In another embodiment, a new alloy includes not greater than 1.000 wt. % Li. In yet another embodiment, a new alloy includes not greater than 0.980 wt. % Li.

Zinc (Zn) is generally included in the new alloy, and generally in the range of from 0.50 wt. % Zn to 2.0 wt. % Zn. More specific embodiments relating to zinc are provided near the end of this section.

The weight ratio of copper-to-zinc in the alloy may be related to its improved properties (e.g., its quench sensitivity). In one embodiment, a new 2xxx aluminum alloy realizes a copper-to-zinc weight ratio of not greater than 4.25:1 (Cu:Zn).

Manganese (Mn) is generally included in the new alloy, and generally in the range of from 0.10 wt. % to 0.60 wt. % Mn. In one embodiment, a new alloy includes at least 0.125 wt. % Mn. In another embodiment, anew alloy includes at least 0.15 wt. % Mn. In yet another embodiment, a new alloy includes at least 0.175 wt. % Mn. In another embodiment, a new alloy includes at least 0.20 wt. % Mn. In another embodiment, a new alloy includes at least 0.225 wt. % Mn. In yet another embodiment, a new alloy includes at least 0.25 wt. % Mn. In another embodiment, a new alloy includes at least 0.27 wt. % Mn. In one embodiment, a new alloy includes not greater than 0.55 wt. % Mn. In another embodiment, a new alloy includes not greater than 0.50 wt. % Mn. In yet another embodiment, a new alloy includes not greater than 0.45 wt. % Mn. In another embodiment, a new alloy includes not greater than 0.425 wt. % Mn. In yet another embodiment, a new alloy includes not greater than 0.40 wt. % Mn. In another embodiment, a new alloy includes not greater than 0.375 wt. % Mn. In yet another embodiment, a new alloy includes not greater than 0.35 wt. % Mn. In another embodiment, a new alloy includes not greater than 0.325 wt. % Mn. In another embodiment, a new alloy includes not greater than 0.30 wt. % Mn. In the alloying industry, manganese may be considered both an alloying ingredient and a grain structure control element—the manganese retained in solid solution may enhance a mechanical property of the alloy (e.g., strength and/or toughness), while the manganese in particulate form (e.g., as $Al_6Mn$, $Al_{12}Mn_3Si_2$, $Al_{20}Cu_2Mn_3$—sometimes referred to as dispersoids) may assist with grain structure control and may also improve damage tolerance properties, such as fracture toughness. However, since Mn is separately defined with its own composition limits in the present patent application, it is not within the definition of "grain structure control element" (described below) for the purposes of the present patent application.

Magnesium (Mg) is included in the new alloy, and generally in the range of from 0.05 wt. % to 0.35 wt. % Mg. More specific embodiments relating to magnesium are provided near the end of this section.

The alloy may include 0.05 to 0.50 wt. % of at least one grain structure control element selected from the group consisting of zirconium (Zr), scandium (Sc), chromium (Cr), vanadium (V) and/or hafnium (Hf), and/or other rare earth elements, and such that the utilized grain structure control element(s) is/are maintained below maximum solubility. As used herein, "grain structure control element" means elements or compounds that are deliberate alloying additions with the goal of forming second phase particles, usually in the solid state, to control solid state grain structure changes during thermal processes, such as recovery and recrystallization. For purposes of the present patent application, grain structure control elements include Zr, Sc, Cr, V, Hf, and other rare earth elements, to name a few, but excludes Mn.

The amount of grain structure control material utilized in an alloy is generally dependent on the type of material utilized for grain structure control and/or the alloy production process. In one approach, the grain structure control element is Zr, and the alloy includes from 0.05 wt. % to 0.20 wt. % Zr. In one embodiment, the aluminum alloy includes at least 0.06 wt. % Zr. In another embodiment, the aluminum alloy includes at least 0.07 wt. % Zr. In yet another embodiment, the aluminum alloy includes at least 0.08 wt. % Zr. In one embodiment, the aluminum alloy includes not greater than 0.18 wt. % Zr. In another embodiment, the aluminum alloy includes not greater than 0.16 wt. % Zr. In another embodiment, the aluminum alloy includes not greater than 0.15 wt. % Zr. In yet another embodiment, the aluminum alloy includes not greater than 0.14 wt. % Zr. In another embodiment, the aluminum alloy includes not greater than 0.13 wt. % Zr. In one embodiment, the alloy includes from 0.05 wt. % to 0.15 wt. % Zr. In another embodiment, the alloy includes from 0.07 wt. % to 0.14 wt. % Zr. In another embodiment, the alloy includes from 0.08 wt. % to 0.13 wt. % Zr.

The alloy may include up to 0.15 wt. % Ti cumulatively for grain refining and/or other purposes. Grain refiners are inoculants or nuclei to seed new grains during solidification of the alloy. An example of a grain refiner is a 9.525 mm rod comprising 96% aluminum, 3% titanium (Ti) and 1% boron (B) (all in weight percent), where virtually all boron is present as finely dispersed $TiB_2$ particles. During casting, a grain refining rod may be fed in-line into the molten alloy flowing into the casting pit at a controlled rate. The amount of grain refiner included in the alloy is generally dependent on the type of material utilized for grain refining and the alloy production process. Examples of grain refiners include Ti combined with B (e.g., $TiB_2$) or carbon (TiC), although other grain refiners, such as Al—Ti master alloys may be utilized. Generally, grain refiners are added in an amount ranging from 0.0003 wt. % to 0.005 wt. % to the alloy, depending on the desired as-cast grain size. In addition, Ti may be separately added to the alloy in an amount up to 0.15 wt. %, depending on product form, to increase the effectiveness of grain refiner, and typically in the range of 0.005 to 0.15 wt. % Ti. When Ti is included in the alloy, it is generally present in an amount of from 0.01 to 0.10 wt. %. In one embodiment, a new alloy includes at least 0.005 wt. % Ti. In another embodiment, a new alloy includes at least 0.01 wt. % Ti. In yet another embodiment, a new alloy includes at least 0.015 wt. % Ti. In another embodiment, a new alloy includes at least 0.020 wt. % Ti. In one embodiment, a new alloy includes not greater than 0.10 wt. % Ti. In another embodiment, a new alloy includes not greater than 0.08 wt. % Ti. In yet another embodiment, a new alloy includes not greater than 0.07 wt. % Ti. In another embodiment, a new alloy includes not greater than 0.06 wt. % Ti. In yet another embodiment, a new alloy includes not greater than 0.05 wt. % Ti. In one embodiment, the aluminum alloy includes a grain refiner, and the grain refiner is at least one of $TiB_2$ and TiC, where the wt. % of Ti in the alloy is from 0.01 to 0.06 wt. %, or from 0.01 to 0.03 wt. %.

The new aluminum alloy may include iron (Fe). The iron content of the new alloy should generally not exceed 0.15 wt. %. In one embodiment, a new alloy may include at least 0.01 wt. % Fe. In one embodiment, a new alloy includes not greater than 0.12 wt. % Fe. In another embodiment, a new alloy includes not greater than 0.10 wt. % Fe. In yet another embodiment, a new alloy includes not greater than 0.08 wt. % Fe. In another embodiment, a new alloy includes not greater than 0.06 wt. % Fe. In yet another embodiment, a new alloy includes not greater than 0.04 wt. % Fe.

The new aluminum alloy may include silicon (Si). The silicon content of the new alloy should generally not exceed 0.12 wt. %. In one embodiment, a new alloy may include at least 0.01 wt. % Si. In one embodiment, a new alloy includes not greater than 0.10 wt. % Si. In another embodiment, a new alloy includes not greater than 0.08 wt. % Si. In yet another embodiment, a new alloy includes not greater than 0.06 wt. % Si. In another embodiment, a new alloy includes not greater than 0.04 wt. % Si.

As noted above, the new aluminum alloy may optionally include silver and in an amount of up to 0.22 wt. %. In one embodiment, a new alloy includes not greater than 0.20 wt. % Ag. In another embodiment, a new alloy includes not greater than 0.15 wt. % Ag. In yet another embodiment, a new alloy includes not greater than 0.10 wt. % Ag. In another embodiment, a new alloy includes not greater than 0.05 wt. % Ag. In yet another embodiment, a new alloy includes not greater than 0.01 wt. % Ag. In another embodiment, a new alloy includes not greater than 0.005 wt. % Ag and/or is not detectable in a new alloy.

As noted above, the new alloys generally include the stated alloying ingredients, the balance being aluminum, optional incidental elements, and impurities. As used herein, "incidental elements" means those elements or materials, other than the above listed elements, that may optionally be added to the alloy to assist in the production of the alloy. Examples of incidental elements include casting aids, such as grain refiners and deoxidizers. Optional incidental elements may be included in the alloy in a cumulative amount of up to 1.0 wt. %. As one non-limiting example, one or more incidental elements may be added to the alloy during casting to reduce or restrict (and is some instances eliminate) ingot cracking due to, for example, oxide fold, pit and oxide patches. These types of incidental elements are generally referred to herein as deoxidizers. Examples of some deoxidizers include Ca, Sr, and Be. When calcium (Ca) is included in the alloy, it is generally present in an amount of up to about 0.05 wt. %, or up to about 0.03 wt. %. In some embodiments, Ca is included in the alloy in an amount of about 0.001-0.03 wt. % or about 0.05 wt. %, such as 0.001-0.008 wt. % (or 10 to 80 ppm). Strontium (Sr) may be included in the alloy as a substitute for Ca (in whole or in part), and thus may be included in the alloy in the same or similar amounts as Ca. Traditionally, beryllium (Be) additions have helped to reduce the tendency of ingot cracking, though for environmental, health and safety reasons, some embodiments of the alloy are substantially Be-free. When Be is included in the alloy, it is generally present in an amount of up to about 20 ppm. Incidental elements may be present in minor amounts, or may be present in significant amounts, and may add desirable or other characteristics on their own without departing from the alloy described herein, so long as the alloy retains the desirable characteristics described herein. It is to be understood, however, that the scope of this disclosure should not/cannot be avoided through the mere addition of an element or elements in quantities that would not otherwise impact on the combinations of properties desired and attained herein.

The new 2xxx aluminum alloys generally contain low amounts of impurities. In one embodiment, a new 2xxx aluminum alloy includes not greater than 0.15 wt. %, in total, of the impurities, and wherein the 2xxx aluminum alloy includes not greater than 0.05 wt. % of each of the impurities. In another embodiment, a new 2xxx aluminum alloy includes not greater than 0.10 wt. %, in total, of the impurities, and wherein the 2xxx aluminum alloy includes not greater than 0.03 wt. % of each of the impurities.

a. Example First Version of the New 2xxx Aluminum Alloy

In one embodiment, a first version of the new 2xxx aluminum alloy includes first tailored amounts of copper, magnesium and zinc. In one approach, the first version includes from 3.1 to 3.8 wt. % copper, from 0.5 to 2.0 wt. % Zn, and from 0.05 to 0.35 wt. % Mg.

In one embodiment, the first version includes at least 3.2 wt. % Cu. In another embodiment, the first version includes at least 3.3 wt. % Cu. In one embodiment, the first version includes not greater than 3.75 wt. % Cu. In another embodiment, the first version includes not greater than 3.7 wt. % Cu. In one embodiment, the first version includes not greater than 3.65 wt. % Cu. In another embodiment, the first version includes not greater than 3.6 wt. % Cu.

In one embodiment, the first version includes at least 0.6 wt. % Zn. In another embodiment, the first version includes at least 0.7 wt. % Zn. In yet another embodiment, the first version includes at least 0.75 wt. % Zn. In another embodiment, the first version includes at least 0.8 wt. % Zn. In yet another embodiment, the first version includes at least 0.85 wt. % Zn. In another embodiment, the first version includes at least 0.9 wt. % Zn. In yet another embodiment, the first version includes at least 0.95 wt. % Zn. In one embodiment, the first version includes not greater than 1.8 wt. % Zn. In another embodiment, the first version includes not greater than 1.6 wt. % Zn. In yet another embodiment, the first version includes not greater that 1.4 wt. % Zn. In another embodiment, the first version includes not greater than 1.3 wt. % Zn. In yet another embodiment, the first version includes not greater that 1.2 wt. % Zn. In another embodiment, the first version includes not greater than 1.1 wt. % Zn. In yet another embodiment, the first version includes not greater that 1.05 wt. % Zn.

As noted above, the weight ratio of copper-to-zinc in the alloy may be related to its improved properties (e.g., its quench sensitivity). In one embodiment, the first version realizes a copper-to-zinc (weight) ratio of not greater than 4.25:1 (Cu:Zn), i.e., (wt. % Cu)/(wt. % Zn) of the alloy is not greater than 4.25. In another embodiment, the first version realizes a copper-to-zinc (weight) ratio of not greater than 4.10:1. In yet another embodiment, the first version realizes a copper-to-zinc (weight) ratio of not greater than 4.00:1. In another embodiment, the first version realizes a copper-to-zinc (weight) ratio of not greater than 3.90:1. In yet another embodiment, the first version realizes a copper-to-zinc (weight) ratio of not greater than 3.80:1. In another embodiment, the first version realizes a copper-to-zinc (weight) ratio of not greater than 3.78:1.

In one embodiment, the first version includes at least 0.10 wt. % Mg. In another embodiment, the first version includes at least 0.125 wt. % Mg. In yet another embodiment, the first version includes at least 0.15 wt. % Mg. In another embodiment, the first version includes at least 0.175 wt. % Mg. In yet another embodiment, the first version includes at least 0.20 wt. % Mg. In another embodiment, the first version includes at least 0.21 wt. % Mg. In yet another embodiment, the first version includes at least 0.22 wt. % Mg. In one embodiment, the first version includes not greater than 0.325 wt. % Mg. In another embodiment, the first version includes not greater than 0.30 wt. % Mg. In yet another embodiment, the first version includes not greater than 0.29 wt. % Mg. In another embodiment, the first version includes not greater than 0.28 wt. % Mg.

Various first version embodiments of the 2xxx alloy are provided below.

TABLE 1a

EXEMPLARY FIRST VERSION ALLOYS (In weight percent)

| Alloy | Cu | Li | Zn | Mn | Mg | Ag |
|---|---|---|---|---|---|---|
| 1V-1 | 3.1-3.8 | 0.82-1.20 | 0.5-2.0 | 0.10-0.60 | 0.05-0.35 | ≤0.22 |
| 1V-2 | 3.2-3.75 | 0.85-1.15 | 0.6-1.8 | 0.15-0.55 | 0.10-0.325 | ≤0.005 |
| 1V-3 | 3.2-3.7 | 0.875-1.10 | 0.7-1.6 | 0.20-0.45 | 0.125-0.30 | ≤0.005 |
| 1V-4 | 3.3-3.7 | 0.90-1.075 | 0.75-1.4 | 0.20-0.425 | 0.15-0.29 | ≤0.005 |
| 1V-5 | 3.3-3.65 | 0.90-1.050 | 0.8-1.3 | 0.225-0.40 | 0.175-0.29 | ≤0.005 |
| 1V-6 | 3.3-3.6 | 0.90-1.025 | 0.85-1.2 | 0.225-0.375 | 0.20-0.29 | ≤0.005 |
| 1V-7 | 3.3-3.6 | 0.90-1.000 | 0.9-1.1 | 0.25-0.35 | 0.21-0.28 | ≤0.005 |
| 1V-8 | 3.3-3.6 | 0.90-1.000 | 0.95-1.05 | 0.27-0.325 | 0.22-0.28 | ≤0.005 |

TABLE 1b

EXEMPLARY FIRST VERSION ALLOYS (In weight percent) (cont.)

| Alloy | Cu:Zn | GSC* | Fe | Si | Ti | Impurities (Each/Total) | Balance** |
|---|---|---|---|---|---|---|---|
| 1V-1 | ≤4.25:1 | 0.05-0.20 Zr | ≤0.15 | ≤0.12 | ≤0.15 | ≤0.05/≤0.15 | Al and Opt. Incid. El. |
| 1V-2 | ≤4.25:1 | 0.05-0.18 Zr | ≤0.12 | ≤0.10 | 0.01-0.10 | ≤0.05/≤0.15 | Al and Opt. Incid. El. |
| 1V-3 | ≤4.25:1 | 0.05-0.16 Zr | ≤0.10 | ≤0.08 | 0.01-0.10 | ≤0.05/≤0.15 | Al and Opt. Incid. El. |
| 1V-4 | ≤4.25:1 | 0.05-0.15 Zr | ≤0.08 | ≤0.06 | 0.01-0.10 | ≤0.05/≤0.15 | Al and Opt. Incid. El. |
| 1V-5 | ≤4.25:1 | 0.05-0.15 Zr | ≤0.08 | ≤0.06 | 0.01-0.10 | ≤0.05/≤0.15 | Al and Opt. Incid. El. |
| 1V-6 | ≤4.10:1 | 0.05-0.15 Zr | ≤0.08 | ≤0.06 | 0.01-0.10 | ≤0.03/≤0.10 | Al and Opt. Incid. El. |

TABLE 1b-continued

EXEMPLARY FIRST VERSION ALLOYS (In weight percent) (cont.)

| Alloy | Cu:Zn | GSC* | Fe | Si | Ti | Impurities (Each/Total) | Balance** |
|---|---|---|---|---|---|---|---|
| 1V-7 | ≤4.00:1 | 0.05-0.15 Zr | ≤0.08 | ≤0.06 | 0.01-0.10 | ≤0.03/≤0.10 | Al and Opt. Incid. El. |
| 1V-8 | ≤3.78:1 | 0.05-0.15 Zr | ≤0.06 | ≤0.04 | 0.01-0.10 | ≤0.03/≤0.10 | Al and Opt. Incid. El. |

*GSC = grain structure control
**Op. Incid. El. = Optional Incidental Elements

In one embodiment, a first version includes 3.2-3.7 wt. % Cu, 0.85-1.15 wt. % Li, 0.75-1.25 wt. % Zn, wherein Cu:Zn (weight ratio) is ≤4.25:1, 0.15-0.29 wt. % Mg, (X1, X2, X3, X4 or X5) wt. % Mn, ≤0.005 wt. % Ag, 0.05-0.15 wt. % Zr, ≤0.10 wt. % Fe, ≤0.08 wt. % Si, 0.01-0.10 wt. % Ti, the balance being aluminum, optional incidental elements, and impurities, wherein X1 is 0.15-0.40 (i.e., X1 wt. % Mn is 0.15-0.40 wt. % Mn), wherein X2 is 0.15-0.30, wherein X3 is 0.15-0.25, wherein X4 is 0.20-0.40, and wherein X5 is 0.25-0.35.

b. Example Second Version of the New 2xxx Aluminum Alloy

In one embodiment, a second version of the new 2xxx aluminum alloy includes second tailored amounts of copper, magnesium and zinc. In one approach, the second version includes from 2.5 to 3.4 wt. % copper, from 0.5 to 2.0 wt. % Zn, and from 0.05 to 0.35 wt. % Mg.

In one embodiment, the second version includes at least 2.6 wt. % Cu. In another embodiment, the second version includes at least 2.7 wt. % Cu. In yet another embodiment, the second version includes at least 2.8 wt. % Cu. In another embodiment, the second version includes at least 2.85 wt. % Cu. In one embodiment, the second version includes not greater than 3.35 wt. % Cu. In another embodiment, the second version includes not greater than 3.3 wt. % Cu. In one embodiment, the second version includes not greater than 3.25 wt. % Cu. In another embodiment, the second version includes not greater than 3.2 wt. % Cu. In another embodiment, the second version includes not greater than 3.15 wt. % Cu.

In one embodiment, the second version includes at least 0.6 wt. % Zn. In another embodiment, the second version includes at least 0.8 wt. % Zn. In yet another embodiment, the second version includes at least 1.0 wt. % Zn. In another embodiment, the second version includes at least 1.1 wt. % Zn. In yet another embodiment, the second version includes at least 1.2 wt. % Zn. In another embodiment, the second version includes at least 1.3 wt. % Zn. In one embodiment, the second version includes not greater than 1.9 wt. % Zn. In another embodiment, the second version includes not greater than 1.8 wt. % Zn. In yet another embodiment, the second version includes not greater that 1.7 wt. % Zn. In another embodiment, the second version includes not greater than 1.6 wt. % Zn. In yet another embodiment, the second version includes not greater that 1.5 wt. % Zn.

As noted above, the weight ratio of copper-to-zinc in the alloy may be related to its improved properties (e.g., its quench sensitivity). In one embodiment, the second version realizes a copper-to-zinc (weight) ratio of not greater than 4.25:1 (Cu:Zn), i.e., (wt. % Cu)/(wt. % Zn) of the alloy is not greater than 4.00:1. In another embodiment, the second version realizes a copper-to-zinc (weight) ratio of not greater than 3.75:1. In yet another embodiment, the second version realizes a copper-to-zinc (weight) ratio of not greater than 3.50:1. In another embodiment, the second version realizes a copper-to-zinc (weight) ratio of not greater than 3.30:1. In yet another embodiment, the second version realizes a copper-to-zinc (weight) ratio of not greater than 3.10:1. In another embodiment, the second version realizes a copper-to-zinc (weight) ratio of not greater than 2.95:1. In yet another embodiment, the second version realizes a copper-to-zinc (weight) ratio of not greater than 2.90:1. In another embodiment, the second version realizes a copper-to-zinc (weight) ratio of not greater than 2.75:1. In another embodiment, the second version realizes a copper-to-zinc (weight) ratio of not greater than 2.67:1. In another embodiment, the second version realizes a copper-to-zinc (weight) ratio of not greater than 2.50:1. In another embodiment, the second version realizes a copper-to-zinc (weight) ratio of not greater than 2.42:1.

In one embodiment, the second version includes at least 0.10 wt. % Mg. In another embodiment, the second version includes at least 0.12 wt. % Mg. In yet another embodiment, the second version includes at least 0.13 wt. % Mg. In another embodiment, the second version includes at least 0.14 wt. % Mg. In yet another embodiment, the second version includes at least 0.15 wt. % Mg. In another embodiment, the second version includes at least 0.16 wt. % Mg. In yet another embodiment, the second version includes at least 0.17 wt. % Mg. In one embodiment, the second version includes not greater than 0.30 wt. % Mg. In another embodiment, the second version includes not greater than 0.275 wt. % Mg. In yet another embodiment, the second version includes not greater than 0.25 wt. % Mg. In another embodiment, the second version includes not greater than 0.24 wt. % Mg. In yet another embodiment, the second version includes not greater than 0.23 wt. % Mg.

Various second version embodiments of the new 2xxx alloy are provided below.

TABLE 2a

EXEMPLARY SECOND VERSION ALLOYS (In weight percent)

| Alloy | Cu | Li | Zn | Mn | Mg | Ag |
|---|---|---|---|---|---|---|
| 2V-1 | 2.5-3.4 | 0.82-1.20 | 0.5-2.0 | 0.10-0.60 | 0.05-0.35 | ≤0.22 |
| 2V-2 | 2.6-3.4 | 0.85-1.15 | 0.6-1.9 | 0.15-0.55 | 0.10-0.30 | ≤0.005 |
| 2V-3 | 2.6-3.35 | 0.875-1.15 | 0.8-1.8 | 0.20-0.45 | 0.12-0.275 | ≤0.005 |

TABLE 2a-continued

EXEMPLARY SECOND VERSION ALLOYS (In weight percent)

| Alloy | Cu | Li | Zn | Mn | Mg | Ag |
|---|---|---|---|---|---|---|
| 2V-4 | 2.7-3.35 | 0.90-1.10 | 1.0-1.7 | 0.20-0.425 | 0.13-0.25 | ≤0.005 |
| 2V-5 | 2.7-3.3 | 0.90-1.10 | 1.1-1.7 | 0.225-0.40 | 0.14-0.25 | ≤0.005 |
| 2V-6 | 2.8-3.25 | 0.90-1.075 | 1.1-1.6 | 0.225-0.375 | 0.15-0.24 | ≤0.005 |
| 2V-7 | 2.8-3.2 | 0.925-1.05 | 1.2-1.5 | 0.25-0.35 | 0.16-0.24 | ≤0.005 |
| 2V-8 | 2.85-3.15 | 0.95-1.05 | 1.3-1.5 | 0.27-0.325 | 0.17-0.23 | ≤0.005 |

TABLE 2b

EXEMPLARY SECOND VERSION ALLOYS (In weight percent) (cont.)

| Alloy | Cu:Zn | GSC* | Fe | Si | Ti | Impurities (Each/Total) | Balance** |
|---|---|---|---|---|---|---|---|
| 2V-1 | ≤4.25:1 | 0.05-0.20 Zr | ≤0.15 | ≤0.12 |  | ≤0.15 | ≤0.05/≤0.15 | Al and Opt. Incid. El. |
| 2V-2 | ≤4.00:1 | 0.05-0.18 Zr | ≤0.12 | ≤0.10 | 0.01-0.10 | ≤0.05/≤0.15 | Al and Opt. Incid. El. |
| 2V-3 | ≤4.00:1 | 0.05-0.16 Zr | ≤0.10 | ≤0.08 | 0.01-0.10 | ≤0.05/≤0.15 | Al and Opt. Incid. El. |
| 2V-4 | ≤3.30:1 | 0.05-0.15 Zr | ≤0.08 | ≤0.06 | 0.01-0.10 | ≤0.05/≤0.15 | Al and Opt. Incid. El. |
| 2V-5 | ≤2.95:1 | 0.05-0.15 Zr | ≤0.08 | ≤0.06 | 0.01-0.10 | ≤0.05/≤0.15 | Al and Opt. Incid. El. |
| 2V-6 | ≤2.90:1 | 0.05-0.15 Zr | ≤0.08 | ≤0.06 | 0.01-0.10 | ≤0.03/≤0.10 | Al and Opt. Incid. El. |
| 2V-7 | ≤2.67:1 | 0.05-0.15 Zr | ≤0.08 | ≤0.06 | 0.01-0.10 | ≤0.03/≤0.10 | Al and Opt. Incid. El. |
| 2V-8 | ≤2.42:1 | 0.05-0.15 Zr | ≤0.06 | ≤0.04 | 0.01-0.10 | ≤0.03/≤0.10 | Al and Opt. Incid. El. |

*GSC = grain structure control
**Op. Incid. El. = Optional Incidental Elements

In one embodiment, a second version includes 2.7-3.3 wt. % Cu, 0.85-1.15 wt. % Li, 1.2-1.6 wt. % Zn, wherein Cu:Zn (weight ratio) is ≤4.25:1, 0.15-0.30 wt. % Mg, (Y1, Y2, Y3, Y4 or Y5) wt. % Mn, ≤0.005 wt. % Ag, 0.05-0.15 wt. % Zr, ≤0.10 wt. % Fe, ≤0.08 wt. % Si, 0.01-0.10 wt. % Ti, the balance being aluminum, optional incidental elements, and impurities, wherein Y1 is 0.15-0.40 (i.e., Y1 wt. % Mn is 0.15-0.40 wt. % Mn), wherein Y2 is 0.15-0.30, wherein Y3 is 0.15-0.25, wherein Y4 is 0.20-0.40, and wherein Y5 is 0.25-0.35.

ii. Product Forms

The new alloys may be useful in a variety of product forms, including ingot or billet, wrought product forms (plate, forgings and extrusions), shape castings, additively manufactured products, and powder metallurgy products, for instance.

In one embodiment, a new 2xxx aluminum alloy is in the form of a thick wrought product. Thick wrought aluminum alloy products are those wrought products having a cross-sectional thickness of at least 12.7 mm. The wrought products may be rolled products, forged products or extruded products. In one embodiment, a thick wrought aluminum alloy product has a thickness of at least 25.4 mm. In another embodiment, a thick wrought aluminum alloy product has a thickness of at least 50.8 mm. In yet another embodiment, a thick wrought aluminum alloy product has a thickness of at least 76.2 mm. In another embodiment, a thick wrought aluminum alloy product has a thickness of at least 101.6 mm. In yet another embodiment, a thick wrought aluminum alloy product has a thickness of at least 126.0 mm. In another embodiment, a thick wrought aluminum alloy product has a thickness of at least 152.4 mm. The improved properties described herein may be achieved with thick wrought products having a thickness of up to 304.8 mm. In one embodiment, a thick wrought aluminum alloy product has a thickness of not greater than 254.0 mm. In another embodiment, a thick wrought aluminum alloy product has a thickness of not greater than 203.2 mm. In yet another embodiment, a thick wrought aluminum alloy product has a thickness of not greater than 177.8 mm. As used in this paragraph, thickness refers to the minimum thickness of the product, realizing that some portions of the product may realize slightly larger thicknesses than the minimum stated.

iii. Wrought Processing

The new alloy can be prepared into wrought form, and in the appropriate temper, by more or less conventional practices, including direct chill (DC) casting the aluminum alloy into ingot form. After conventional scalping, lathing or peeling (if needed) and homogenization, which homogenization may be completed before or after scalping, these ingots may be further processed by hot working the product. The product may then be optionally cold worked, optionally annealed, solution heat treated, quenched, and final cold worked (e.g., by stretching or compression of from 0.5% to 10%). After the final cold working step, the product may be artificially aged. Thus, in some embodiments, the products may be produced in a T3 or T8 temper. In other embodiments, other T tempers may be used (e.g., any of a T1, T2, T4, T5, T6, T7 or T9 temper). T tempers are defined in ANSI H35.1 (2009).

iv. Properties

The new 2xxx aluminum lithium alloys generally realize an improved combination of at least two of strength, elongation, fracture toughness, and stress corrosion cracking resistance.

In one embodiment, a new 2xxx aluminum lithium alloy has a thickness of at least 80 mm and realizes a tensile yield strength (ST) of at least 440 MPa in the T8 temper. In another embodiment, a new 2xxx aluminum lithium alloy has a thickness of at least 80 mm and realizes a tensile yield strength (ST) of at least 450 MPa in the T8 temper. In yet another embodiment, a new 2xxx aluminum lithium alloy has a thickness of at least 80 mm and realizes a tensile yield strength (ST) of at least 460 MPa in the T8 temper. In another embodiment, a new 2xxx aluminum lithium alloy has a thickness of at least 80 mm and realizes a tensile yield strength (ST) of at least 470 MPa in the T8 temper. In yet another embodiment, a new 2xxx aluminum lithium alloy has a thickness of at least 80 mm and realizes a tensile yield strength (ST) of at least 480 MPa, or more, in the T8 temper. The above strength properties may be realized in products having a thickness of at least 100 mm, or at least 125 mm, or at least 150 mm, or higher.

In one embodiment, a new 2xxx aluminum lithium alloy has a thickness of at least 80 mm and realizes a plane-strain ($K_{IC}$) fracture toughness (S-L) of at least 20 MPa-sqrt-m in the T8 temper. In another embodiment, a new 2xxx aluminum lithium alloy has a thickness of at least 80 mm and realizes a plane-strain ($K_{IC}$) fracture toughness (S-L) of at least 21 MPa-sqrt-m in the T8 temper. In yet another embodiment, a new 2xxx aluminum lithium alloy has a thickness of at least 80 mm and realizes a plane-strain ($K_{IC}$) fracture toughness (S-L) of at least 22 MPa-sqrt-m in the T8 temper. In another embodiment, a new 2xxx aluminum lithium alloy has a thickness of at least 80 mm and realizes a plane-strain ($K_{IC}$) fracture toughness (S-L) of at least 23 MPa-sqrt-m in the T8 temper. In yet another embodiment, a new 2xxx aluminum lithium alloy has a thickness of at least 80 mm and realizes a plane-strain ($K_{IC}$) fracture toughness (S-L) of at least 24 MPa-sqrt-m in the T8 temper. In another embodiment, a new 2xxx aluminum lithium alloy has a thickness of at least 80 mm and realizes a plane-strain ($K_{IC}$) fracture toughness (S-L) of at least 25 MPa-sqrt-m in the T8 temper. In yet another embodiment, a new 2xxx aluminum lithium alloy has a thickness of at least 80 mm and realizes a plane-strain ($K_{IC}$) fracture toughness (S-L) of at least 26 MPa-sqrt-m, or more, in the T8 temper. The above fracture toughness properties may be realized in products having a thickness of at least 100 mm, or at least 125 mm, or at least 150 mm, or higher.

In one embodiment, a new 2xxx aluminum lithium alloy has a thickness of at least 80 mm and realizes an elongation (ST) of at least 1.5% in the T8 temper. In another embodiment, a new 2xxx aluminum lithium alloy has a thickness of at least 80 mm and realizes an elongation (ST) of at least 2.0% in the T8 temper. In yet another embodiment, a new 2xxx aluminum lithium alloy has a thickness of at least 80 mm and realizes an elongation (ST) of at least 2.5% in the T8 temper. In one embodiment, a new 2xxx aluminum lithium alloy has a thickness of at least 80 mm and realizes an elongation (ST) of at least 3.0%, or more, in the T8 temper. The above elongation properties may be realized in products having a thickness of at least 100 mm, or at least 125 mm, or at least 150 mm, or higher.

In one embodiment, a new 2xxx aluminum lithium alloy has a thickness of at least 80 mm and is stress corrosion cracking resistant (defined below) in the T8 temper. The above stress corrosion cracking resistance properties may be realized in products having a thickness of at least 100 mm, or at least 125 mm, or at least 150 mm, or higher.

In one approach, a new 2xxx aluminum lithium alloy realizes at least 3.0 MPa-sqrt-m (MPa√m) higher plane strain ($K_{IC}$) fracture toughness as compared to a standard 2070 aluminum alloy product, where both products processed to the same product form, gauge, yield strength and temper. For instance, if both a new 2xxx aluminum lithium alloy and a 2070 alloy are produced as 150 mm plate in the T8 temper (with the same amount of stretch or compression, e.g., within 0.5% stretch/compression of each other), and if both alloys are artificially aged to about the same tensile yield strength (e.g., within 5 MPa of one another), then, in this approach, the $K_{IC}$ fracture toughness of the new 2xxx aluminum lithium alloy would be at least 3 MPa-sqrt-m higher than the 2070 alloy. In one embodiment, a new 2xxx aluminum lithium alloy realizes at least 4.0 MPa-sqrt-m higher plane strain ($K_{IC}$) fracture toughness as compared to a standard 2070 aluminum alloy product, where both products processed to the same product form, gauge, yield strength and temper. In another embodiment, a new 2xxx aluminum lithium alloy realizes at least 5.0 MPa-sqrt-m higher plane strain ($K_{IC}$) fracture toughness as compared to a standard 2070 aluminum alloy product, where both products processed to the same product form, gauge, yield strength and temper. A standard 2070 aluminum alloy product nominally includes (targets) 3.5 wt. % Cu, 0.30 wt. % Mn, 0.22 wt. % Mg, 0.30 wt. % Zn, 1.15 wt. % Li, 0.30 wt. % Zn, 0.11 wt. % Zr, ≤0.04 wt. % Si, ≤0.06 wt. % Fe, ≤0.03 wt. % Ti, not greater than 0.10 wt. %, in total, of impurities, and not greater than 0.03 wt. % of each of impurities, the balance being aluminum.

While the above properties generally relate to thick plate products, similar properties may also be realized in thick forged product and thick extruded products. Further, many of the above properties may be realized in combination, as shown by the below examples.

v. Definitions

Unless otherwise indicated, the following definitions apply to the present application:

"2xxx aluminum alloys" are aluminum alloys compositions having copper as the major alloying element as per the Aluminum Association definition provided in "International Alloy Designations and Chemical Composition Limits for Wrought Aluminum and Wrought Aluminum Alloys," page 28 (2015). For purposes of this patent application, 2xxx aluminum alloy compositions may be used in non-wrought products, such as in shape castings, ingot/billet, and additively manufactured products, among others.

"Wrought aluminum alloy product" means an aluminum alloy product that is hot worked after casting, and includes rolled products (sheet or plate), forged products, and extruded products.

"Forged aluminum alloy product" means a wrought aluminum alloy product that is either die forged or hand forged.

"Solution heat treating" means exposure of an aluminum alloy to elevated temperature for the purpose of placing solute(s) into solid solution.

"Hot working" means working the aluminum alloy product at elevated temperature, generally at least 250° F.

"Cold working" means working the aluminum alloy product at temperatures that are not considered hot working temperatures, generally below about 250° F. (e.g., at ambient).

"Artificially aging" means exposure of an aluminum alloy to elevated temperature for the purpose of precipitating solute(s). Artificial aging may occur in one or a plurality of steps, which can include varying temperatures and/or exposure times.

Strength and elongation are measured in accordance with ASTM E8 and B557.

Fracture toughness is measured in accordance with ASTM E399.

"Stress corrosion cracking resistant" means that all specimens of a 2xxx aluminum alloy product do not fail after 30 days of alternate immersion testing at a net stress of 379 MPa in accordance with ASTM G44/G47, and with at least 5 specimens being required for testing. In one embodiment, all specimens of a 2xxx aluminum alloy product do not fail after 60 days of alternate immersion testing at a net stress of 379 MPa in accordance with ASTM G44/G47, and with at least 5 specimens being required for testing. In another embodiment, all specimens of a 2xxx aluminum alloy product do not fail after 90 days of alternate immersion testing at a net stress of 379 MPa in accordance with ASTM G44/G47, and with at least 5 specimens being required for testing. SCC test specimens are extracted so as to be centered at the mid-plane and oriented in the ST direction relative to the original alloy product.

As used herein, "additive manufacturing" means "a process of joining materials to make objects from 3D model data, usually layer upon layer, as opposed to subtractive manufacturing methodologies", as defined in ASTM F2792-12a entitled "Standard Terminology for Additively Manufacturing Technologies". Non-limiting examples of additive manufacturing processes useful in producing aluminum alloy products include, for instance, DMLS (direct metal laser sintering), SLM (selective laser melting), SLS (selective laser sintering), and EBM (electron beam melting), among others. Any suitable feedstocks made from the above new 2xxx aluminum alloys may be used, including one or more powders, one or more wires, one or more sheets, and combinations thereof. In some embodiments the additive manufacturing feedstock is comprised of one or more powders comprising the new 2xxx aluminum alloys. Shavings are types of particles. In some embodiments, the additive manufacturing feedstock is comprised of one or more wires comprising the new 2xxx aluminum alloys. A ribbon is a type of wire. In some embodiments, the additive manufacturing feedstock is comprised of one or more sheets comprising the new 2xxx aluminum alloys. Foil is a type of sheet.

These and other aspects, advantages, and novel features of this new technology are set forth in part in the description that follows and will become apparent to those skilled in the art upon examination of the following description and figures, or may be learned by practicing one or more embodiments of the technology provided for by the present disclosure.

The figures constitute a part of this specification and include illustrative embodiments of the present disclosure and illustrate various objects and features thereof. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though they may. Furthermore, the phrases "in another embodiment" and "in some other embodiments" as used herein do not necessarily refer to a different embodiment, although they may. Thus, various embodiments of the invention may be readily combined, without departing from the scope or spirit of the invention.

In addition, as used herein, the term "or" is an inclusive "or" operator, and is equivalent to the term "and/or," unless the context clearly dictates otherwise (e.g., "X1, X2, X3, X4 or X5" does not mean "and/or" herein because all of X1-X5 are unique and distinct from one another). The term "based on" is not exclusive and allows for being based on additional factors not described, unless the context clearly dictates otherwise. In addition, throughout the specification, the meaning of "a," "an," and "the" include plural references, unless the context clearly dictates otherwise. The meaning of "in" includes "in" and "on", unless the context clearly dictates otherwise.

While a number of embodiments of the present invention have been described, it is understood that these embodiments are illustrative only, and not restrictive, and that many modifications may become apparent to those of ordinary skill in the art. Further still, unless the context clearly requires otherwise, the various steps may be carried out in any desired order, and any applicable steps may be added and/or eliminated.

BRIEF DESCRIPTION OF THE DRAWINGS

FIGS. 1-2 are graphs illustrating the performance of various aluminum alloy products of Example 1.

FIG. 3 is a graph illustrating the performance of various aluminum alloys products of Example 2.

DETAILED DESCRIPTION

Example 1—Plate Testing

Various Al—Li alloys were cast as ingot and homogenized. The composition of each ingot is shown in Table 3a, below. Alloys A and B are invention alloys. Alloy C and the 2070 alloy are non-invention alloys. The 2070 alloy is described in, for instance, commonly-owned U.S. Patent Application Publication No. 2012/0225271.

TABLE 3a

| COMPOSITION OF ALLOYS | | | | | | | | | |
|---|---|---|---|---|---|---|---|---|---|
| Alloy | Si | Fe | Cu | Mn | Mg | Zn | Li | Zr | Ti |
| A-1 | 0.02 | 0.03 | 3.57 | 0.29 | 0.24 | 0.94 | 0.92 | 0.10 | 0.02 |
| A-2 | 0.05 | 0.03 | 3.46 | 0.32 | 0.27 | 1.00 | 0.94 | 0.10 | 0.02 |
| B | 0.04 | 0.04 | 2.96 | 0.32 | 0.21 | 1.42 | 0.98 | 0.09 | 0.02 |
| C | 0.05 | 0.04 | 3.70 | 0.33 | 0.38 | 0.84 | 0.97 | 0.10 | 0.02 |
| 2070 | 0.02 | 0.03 | 3.48 | 0.30 | 0.22 | 0.36 | 1.13 | 0.10 | 0.02 |

The balance of each alloy was aluminum, incidental elements and impurities, with no one impurity exceeding 0.05 wt. %, and with the total amount of impurities not exceeding 0.15 wt. %. After homogenization, the alloys were hot rolled to final gauge, solution heat treated, quenched and stretched about 6%. Approximate final gauges are provided in Table 3b, below.

TABLE 3b

ALLOYS AND FINAL GAUGE

| Alloy | Final Gauge (mm) | Final Gauge (in.) |
|---|---|---|
| A-1(i) | 100 | 3.94 |
| A-1(ii) | 150 | 5.91 |
| A-2(i) | 100 | 3.94 |
| A-2(ii) | 150 | 5.91 |
| B(i) | 100 | 3.94 |
| B(ii) | 150 | 5.91 |
| C(i) | 100 | 3.94 |
| C(ii) | 150 | 5.91 |
| 2070(i) | 100 | 3.94 |
| 2070(ii) | 120 | 4.72 |

Various two-step artificial aging practices are completed on the alloys, the first step being completed at 290° F. (143.3° C.) for various times, as provided in Table 4, below, the second step being 12 hours at 225° F. (107.2° C.). Various mechanical properties of the aged aluminum alloy plates are measured in accordance with ASTM E8 and B557. Fracture toughness properties of some samples were also measured and in accordance with ASTM E399. As shown by the below data and corresponding FIG. 1-2, the invention alloys realized an improved combination of properties in the short transverse direction.

TABLE 4

Mechanical Properties (Short Transverse Direction)

| Alloy | 1st Step Age Time (hrs) | TYS(ST) (MPa) | UTS(ST) (MPa) | Elong. (ST)(%) | $K_{IC}$ (S-L) (MPa-sqrt-m) |
|---|---|---|---|---|---|
| A-1(i) | 25 | 461.3 | 526.0 | 3.2 | 21.6 |
| A-1(i) | 30 | 466.1 | 531.9 | 3.7 | 23.1 |
| A-1(i) | 50 | 482.6 | 543.3 | 3.1 | 20.9 |
| A-2(i) | 25 | 466.0 | 529.0 | 4.7 | 21.2 |
| A-2(i) | 30 | 484.0 | 543.0 | 3.8 | 19.1 |
| B(i) | 40 | 446.1 | 509.5 | 3.7 | 25.9 |
| B(i) | 60 | 451.3 | 511.6 | 4.1 | 24.7 |
| C(i) | 25 | 473.3 | 538.5 | 2.8 | 19.7 |
| C(i) | 45 | 497.5 | 555.0 | 2.1 | 19.2 |
| 2070(i) | 30 | 467.8 | 535.0 | 3.3 | 20.5 |
| 2070(i) | 50 | 489.5 | 548.8 | 2.4 | 15.8 |
| A-1(ii) | 30 | 460.2 | 515.7 | 3.1 | 20.5 |
| A-1(ii) | 50 | 475.4 | 521.2 | 2.0 | 20.4 |
| A-2(ii) | 25 | 442.0 | 496.0 | 3.6 | 24.7 |
| A-2(ii) | 25 | 443.8 | 495.0 | 3.0 | 22.5 |
| A-2(ii) | 30 | 451.5 | 504.0 | 3.0 | 22.9 |

TABLE 4-continued

Mechanical Properties (Short Transverse Direction)

| Alloy | 1st Step Age Time (hrs) | TYS(ST) (MPa) | UTS(ST) (MPa) | Elong. (ST)(%) | $K_{IC}$ (S-L) (MPa-sqrt-m) |
|---|---|---|---|---|---|
| B(ii) | 40 | 440.2 | 484.0 | 2.8 | 22.1 |
| B(ii) | 60 | 443.0 | 489.5 | 2.5 | 23.5 |
| C(ii) | 25 | 465.1 | 517.5 | 2.7 | 19.0 |
| C(ii) | 45 | 486.1 | 534.0 | 2.2 | 18.7 |
| 2070(ii) (120 mm) | 30 | 461.3 | 527.4 | 3.4 | 18.2* |
| 2070(ii) (120 mm) | 50 | 482.6 | 538.1 | 2.7 | 16.5* |

*= $K_Q$ value

At 100 mm, the new alloys generally realize improved fracture toughness at equivalent strength. For instance, invention alloy A-1 realizes about 3 MPa-sqrt-m higher strength over the 2070 alloy at about equivalent strength (at 30 hours of aging). Invention alloy A-2 also is improved over the 2070 alloy, and the A-2 alloy would be expected to achieve results similar to that of the Alloy A-1 if the silicon content of the A-2 alloy were reduced to 0.02 wt. %. Invention alloy B realizes very high fracture toughness at reduced strength levels, but would be expected to achieve results at least as good as A-1, if aged to equivalent strength. The improved properties are even more pronounced at 150 mm, where all of the invention alloys realized much better fracture toughness at equivalent strength. Notably, the invention alloys include less magnesium than non-invention alloy C. The invention alloys also have a Cu:Zn ratio (weight) of not greater than 4.25:1, whereas the non-invention alloys realize higher Cu:Zn ratios. The invention alloys also have more zinc than alloy C and non-invention alloy 2070.

The stress corrosion cracking (SCC) resistance properties of many of the alloys were tested in the ST direction and in accordance with ASTM G44/G47. All of the invention alloys at all aging conditions realized, or were expected to realize, no failures at net stresses of 310 MPa and 379 MPa over a period of 30 days of testing (some alloys are still in test). Conversely, alloy C realized multiple failures at net stresses of 310 MPa and 379 MPa within the 30 day period and under the same testing conditions. This may be due to the fact that alloy C includes high magnesium, which may make alloy C prone to stress corrosion cracking. Alloy C could be aged further to improve corrosion, but its already poor fracture toughness would decrease. Conversely, invention alloys A and B achieve a good combination of four properties: strength, elongation, fracture toughness and stress corrosion cracking resistance.

Example 2—Additional Plate Testing

Three additional Al—Li alloys (all invention) were cast as ingot and homogenized, the compositions of which are shown in Table 5, below.

TABLE 5

Compositions of Example 2 Alloys

| Alloy | Si | Fe | Cu | Mn | Mg | Zn | Ag | Li | Zr | Ti |
|---|---|---|---|---|---|---|---|---|---|---|
| 1 | 0.04 | 0.04 | 3.46 | 0.27 | 0.26 | 0.98 | — | 0.96 | 0.10 | 0.03 |
| 2 | 0.07 | 0.07 | 3.63 | 0.27 | 0.26 | 0.97 | — | 0.96 | 0.09 | 0.02 |
| 3 | 0.06 | 0.04 | 3.50 | 0.26 | 0.22 | 0.96 | — | 0.97 | 0.09 | 0.02 |

The balance of each alloy was aluminum, incidental elements and impurities, with no one impurity exceeding 0.05 wt. %, and with the total amount of impurities not exceeding 0.15 wt. %. After homogenization, the alloys were hot rolled to final gauge, solution heat treated, quenched and then stretched about 6%. The alloys were then artificially aged at various times and temperatures. The aging conditions are shown in Table 6.

TABLE 6

Aging Conditions for Example 2 Alloys

| Condition | First Step | Second Step |
|---|---|---|
| A | 20 hours at 290° F. | 12 hours at 225° F. |
| B | 30 hours at 290° F. | |
| C | 40 hours at 290° F. | |

The alloys were cooled to room temperature between aging steps.

The through-thickness mechanical properties of the alloys were then tested, the results of which are shown in Table 7, below.

TABLE 8

SCC test results (days in test)

| Alloy | Final Gauge (mm) | Aging Condition | Sample 1 | Sample 2 | Sample 3 |
|---|---|---|---|---|---|
| 1 | 59.8 | A | T | T | T |
|  |  | B | T | T | T |
| 2 | 60.8 | A | T | T | T |
|  |  | B | T | T | T |
| 3 | 107.4 | A | T | T | T |
|  |  | B | T | T | T |

T = still had not failed after 20 days in test.

As shown in FIG. 3, Alloys 1-2, having a thickness of about 60 mm, realize an excellent combination of strength and fracture toughness. Alloy 3 realizes a similar strength-toughness trend as the 100 mm alloys of Example 1.

The stress corrosion cracking (SCC) resistance properties of many of the alloys were also tested in the ST direction as per Example 1 at a net stress of 310 MPa. The results are provided in Table 8, below.

TABLE 7

Mechanical Properties of Example 2 Alloys

| Alloy | Final Gauge (mm) | Aging Condition | ST TYS (MPa) | ST UTS (MPa) | ST Elong. (%) | S-L $K_{IC}$ (MPa√m) |
|---|---|---|---|---|---|---|
| 1 | 59.8 | A | 455 | 535 | 7.8 | 27.3 |
|  |  | B | 464 | 542 | 7.3 | 23.9 |
|  |  | C | 473 | 548 | 8.5 | 22.7 |
| 2 | 60.8 | A | 454 | 523 | 7.8 | 22.7 |
|  |  | B | 464 | 532 | 7.0 | 21.8 |
|  |  | C | 468 | 538 | 5.3 | 21.3 |
| 3 | 107.4 | A | 443 | 510 | 6.0 | 22.7 |
|  |  | B | 460 | 524 | 5.8 | 22.0 |
|  |  | C | 463 | 523 | 5.0 | 22.3 |

While various embodiments of the present disclosure have been described in detail, it is apparent that modifications and adaptations of those embodiments will occur to those skilled in the art. However, it is to be expressly understood that such modifications and adaptations are within the spirit and scope of the present disclosure.

What is claimed is:

1. A 2xxx aluminum alloy comprising:
   2.5-3.4 wt. % Cu;
   0.82-1.20 wt. % Li;
   1.1-2.0 wt. % Zn;
   0.10-0.60 wt. % Mn;
   0.05-0.35 wt. % Mg;
   from 0.05 to 0.50 wt. % of at least one grain structure control element, wherein the at least one grain structure control element is selected from the group consisting of Zr, Sc, Cr, V, Hf, other rare earth elements, and combinations thereof;
   up to 0.05 wt. % Ag;
   up to 0.15 wt. % Fe;
   up to 0.12 wt. % Si; and
   up to 0.15 wt. % Ti;
   the balance being aluminum, incidental elements and impurities.

2. The 2xxx aluminum alloy of claim 1, wherein the 2xxx aluminum alloy includes not greater than 0.01 wt. % Ag.

3. The 2xxx aluminum alloy of claim 1, wherein the 2xxx aluminum alloy includes at least 1.3 wt. % Zn.

4. The 2xxx aluminum alloy of claim 1, wherein the 2xxx aluminum alloy includes not greater than 3.2 wt. % Cu.

5. The 2xxx aluminum alloy of claim 1, wherein the 2xxx aluminum alloy includes at least 0.10 wt. % Mg.

6. The 2xxx aluminum alloy of claim 1, wherein (wt. % Cu)/(wt. % Zn) is not greater than 3.5.

7. The 2xxx aluminum alloy of claim 1, wherein the 2xxx aluminum alloy is in the form of a wrought product having a thickness of at least 101.6 mm, wherein the wrought product is in a T8 temper; and
   wherein the wrought product realizes at least one of:
   (i) a tensile yield strength (ST) of at least 440 MPa in the T8 temper;
   (ii) a plane-strain ($K_{IC}$) fracture toughness (S-L) of at least 20 MPa-sqrt-m in the T8 temper;
   (iii) an elongation (ST) of at least 1.5% in the T8 temper; or
   (iv) wherein the wrought product is stress corrosion cracking resistant in the T8 temper.

8. The 2xxx aluminum alloy of claim 7, wherein the wrought product realizes at least two of (i)-(iv).

9. The 2xxx aluminum alloy of claim 7, wherein the wrought product realizes at least three of (i)-(iv).

10. The 2xxx aluminum alloy of claim 7, wherein the wrought product realizes all of (i)-(iv).

11. The 2xxx aluminum alloy of claim 10, wherein the 2xxx aluminum alloy is in the form of a wrought product having a thickness of at least 150 mm.

12. The 2xxx aluminum alloy of claim 7, wherein the 2xxx aluminum alloy is in the form of a wrought product having a thickness of at least 125 mm.

13. The 2xxx aluminum alloy of claim 1, wherein the 2xxx aluminum alloy is in the form of a wrought product having a thickness of at least 101.6 mm, wherein the wrought product is in a T8 temper; and
   wherein the wrought product realizes all of:
   (i) a tensile yield strength (ST) of at least 440 MPa in the T8 temper;
   (ii) a plane-strain ($K_{IC}$) fracture toughness (S-L) of at least 24 MPa-sqrt-m in the T8 temper;
   (iii) an elongation (ST) of at least 3.0%; and
   (iv) wherein the wrought product is stress corrosion cracking resistant in the T8 temper.

14. The 2xxx aluminum alloy of claim 1, wherein (wt. % Cu)/(wt. % Zn) is not greater than 3.10.

15. The 2xxx aluminum alloy of claim 1, wherein (wt. % Cu)/(wt. % Zn) is not greater than 2.75.

16. The 2xxx aluminum alloy of claim 1, wherein the 2xxx aluminum alloy includes at least 0.15 wt. % Mg.

17. The 2xxx aluminum alloy of claim 1, wherein the 2xxx aluminum alloy includes not greater than 1.7 wt. % Zn.

18. The 2xxx aluminum alloy of claim 1, wherein the 2xxx aluminum alloy includes at least 2.7 wt. % Cu.

* * * * *